United States Patent
Schiaffo et al.

(10) Patent No.: US 8,452,146 B2
(45) Date of Patent: May 28, 2013

(54) PROCESS FOR MANUFACTURING AN OPTICAL FIBER AND AN OPTICAL FIBER SO OBTAINED

(75) Inventors: Antonio Schiaffo, Salerno (IT); Franco Cocchini, Salerno (IT); Nicola Scafuro, Mercato San Severino (IT); Giuseppe Galasso, S.antonio Abate (IT)

(73) Assignee: Prysmian S.p.A., Milan (IT)

( * ) Notice: Subject to any disclaimer, the term of this patent is extended or adjusted under 35 U.S.C. 154(b) by 314 days.

(21) Appl. No.: 12/741,359

(22) PCT Filed: Nov. 6, 2007

(86) PCT No.: PCT/EP2007/061946
§ 371 (c)(1),
(2), (4) Date: Aug. 13, 2010

(87) PCT Pub. No.: WO2009/059636
PCT Pub. Date: May 14, 2009

(65) Prior Publication Data
US 2010/0296780 A1    Nov. 25, 2010

(51) Int. Cl.
*G02B 6/036* (2006.01)

(52) U.S. Cl.
USPC .......................................................... 385/128

(58) Field of Classification Search
USPC .......................................................... 385/128
See application file for complete search history.

(56) References Cited

U.S. PATENT DOCUMENTS

| | | | | |
|---|---|---|---|---|
| 4,448,484 A | * | 5/1984 | Lombardi et al. | 385/128 |
| 4,756,600 A | * | 7/1988 | Ramsay et al. | 385/106 |
| 5,104,433 A | * | 4/1992 | Chapin et al. | 65/432 |
| 5,131,735 A | * | 7/1992 | Berkey et al. | 385/43 |
| 6,018,605 A | | 1/2000 | Mills et al. | |
| 6,376,571 B1 | * | 4/2002 | Chawla et al. | 522/64 |

(Continued)

FOREIGN PATENT DOCUMENTS

| EP | 250052 A1 | * | 12/1987 |
|---|---|---|---|
| EP | 0 646 552 A2 | | 4/1995 |
| EP | 1 452 502 A1 | | 9/2004 |
| EP | 1 457 468 A1 | | 9/2004 |

OTHER PUBLICATIONS

Cocchini; "The Lateral Rigidity of Double-Coated Optical Fibers", Journal of Lightwave Technology, vol. 13, No. 8, pp. 1706-1710, (1995).

(Continued)

*Primary Examiner* — Charlie Peng
(74) *Attorney, Agent, or Firm* — Finnegan, Henderson, Farabow, Garrett & Dunner, L.L.P.

(57) ABSTRACT

A process for manufacturing an optical fiber includes: drawing an optical waveguide from a glass preform; applying a layer of a first coating material on the optical waveguide; curing the first coating layer material to obtain a first coating layer; applying a layer of a second coating material onto the first coating layer; applying a layer of colored coating material onto the second coating layer; curing the second coating material and the colored coating material in a single step to obtain a second coating layer superposed on the first coating layer and a colored coating layer superposed on the second coating material layer, the obtained second coating layer having an elastic modulus higher than that of the first coating layer and lower than that of the colored coating layer. An optical fiber and an apparatus for producing it are also provided.

10 Claims, 2 Drawing Sheets

U.S. PATENT DOCUMENTS

| | | | |
|---|---|---|---|
| 6,600,859 B2* | 7/2003 | Chandraiah et al. | 385/114 |
| 6,775,451 B1* | 8/2004 | Botelho et al. | 385/128 |
| 6,797,740 B2 | 9/2004 | Abel et al. | |
| 7,539,381 B2* | 5/2009 | Chen et al. | 385/124 |
| 7,978,948 B2* | 7/2011 | Nakajima et al. | 385/128 |
| 2003/0059188 A1* | 3/2003 | Baker et al. | 385/128 |
| 2003/0165679 A1 | 9/2003 | Bosisio et al. | |
| 2004/0170367 A1* | 9/2004 | Kenkare et al. | 385/128 |
| 2004/0179799 A1 | 9/2004 | Konstadinidis et al. | |
| 2005/0062181 A1* | 3/2005 | Walker | 264/1.24 |

OTHER PUBLICATIONS

International Search Report from the European Patent Office for International Application No. PCT/EP2007/061946, mailing date Aug. 27, 2008.

* cited by examiner

PROCESS FOR MANUFACTURING AN OPTICAL FIBER AND AN OPTICAL FIBER SO OBTAINED

BACKGROUND OF THE INVENTION

1. Field of the Invention

The present invention generally relates to the field of optical fibers and of the manufacturing thereof.

2. Description of the Related Art

Optical fibers, particularly glass fibers, are manufactured starting from a previously made glass body, usually called "preform", by a process known in the art as "drawing". A glass preform is placed at the top of a fiber drawing tower, where it is heated up in a furnace to a temperature sufficiently high to cause the softening of a bottom portion of the preform. The softened preform material is drawn by a tractor, to form an optical fiber glass core.

The glass core is surrounded by a layer, generally of glass, having a refractive index lower than that of the core, said layer being called cladding. In the following, the glass core surrounded by the cladding could be referred to as "optical waveguide".

Over the cladding, at least one, more often two superposed UV radiation-cured coating layers are provided, which form the so-called coating system.

Usually, the coating system is applied onto the optical fiber core during the drawing process.

The coating layer which is in direct contact with the glass core is called "first coating" or "primary coating"; the overlaying coating layer, which is on the exposed surface of the coated fiber, is called "second coating" or "secondary coating".

The coating system helps to absorb forces applied to the coated fiber, and subsequent losses associated therewith, provides protection against microbending, that can lead to attenuation of the signal transmission capability of the coated optical glass fiber, endows the fiber with the desired resistance to handling forces, such as those encountered when the coated fiber is cabled.

The first coating is usually a soft coating, having a relatively low elastic modulus. The second coating is typically a coating having a higher elastic modulus.

Color coding is typically used to distinguish and identify individual fibers in a complex cable.

For example, in telecommunications applications, multiple coated fibers can be arranged into larger structures, such as ribbons and cables, to maximize efficiency. However, after "ribboning" (i.e., arranging a number of fibers side by side and coating them with a common coating in the shape of ribbon) and cabling of the fiber, the individual fiber should be readily distinguishable from each other, so that they can be accurately identified during, for example, installation and maintenance.

Although several methods can be used to color code optical fibers, color coding can be done advantageously with either a colored layer (typically as thick as about 10 microns or less), which is placed over the coated fiber before cabling and/or "ribboning" of the same, or by applying a colored second coating onto the first coating.

The application of a colored layer can take place during the drawing process of the optical fiber.

Optical fiber ribbons are prepared by embedding at least two individual color coded fibers in a common matrix material which, like the first and second coatings, is also radiation-curable. Optical fiber ribbons may comprise, e.g., 4 to 12 colored fibers. The matrix material can encase the color coded optical glass fiber, or the matrix material can edge-bond the glass fibers together. Cure of the matrix material occurs during the "ribboning" stage, after the fibers have been color-coded by applying a colored layer.

In a ribbon design, the colored layer resides between the ribbon matrix material and the fiber second coating. This means that the interfacial characteristics (e.g., surface energy, adhesion) of the colored layer should be carefully selected to fit with those of both the matrix material and the second coating material in the ribbon structure. In particular, the ability of a cured matrix material to be suitably stripped off the colored layer (break-out) is an important technical consideration. Ribbon break-out is generally carried out by applying a mechanical force, although chemical softening of the matrix with use of solvents is also known.

The use of a colored second coating is disclosed, for example, in U.S. Pat. No. 6,797,740.

US20040170367 relates to optical fibers including a layer of primary coating material having a first modulus, a layer of color coating material having a second modulus, a layer of secondary material having a third modulus, and wherein the first, the second, and the third modulus values are different.

The layer of the primary coating material, the layer of the color coating material, and the layer of the secondary coating material are each applied prior to the other layers being cured. All of the three layers are cured together.

In an embodiment a coated optical fiber includes a layer positioned between the primary coating layer and the secondary coating layer. The primary coating layer surrounds the optical fiber (i.e. the optical waveguide), the colored coating layer surrounds the primary coating layer, and the secondary coating layer forms the outermost protective layer. Typically, the color coating material has a modulus between that of the primary and secondary coating materials.

In an alternative embodiment, the color coating layer surrounds the optical fiber and the primary coating layer is between the color coating layer and the outermost secondary coating layer. In this instance, the modulus of the color coating material is preferably less than or equal to the modulus of the primary coating layer. In an alternative embodiment, the primary coating layer is adjacent the optical fiber, the secondary coating layer is adjacent the primary coating layer, and the color coating layer is the outermost layer. The document provides no indication about the modulus values of the layers in this instance.

US20040179799 provides an optical fiber cable that includes a core comprising one or more optical fibers surrounded by a coating system (therein referred to as "protective sheath"), which has a radially-varying elastic modulus, and a method for making the same. The protective sheath includes first and second coating layer portions based on the same coating material. A modifier is added to the coating material of the first coating layer portion. Likewise, a modifier is added to the coating material of the second coating layer portion. The addition of a modifier to the first coating layer portion and the addition of a modifier to the second coating layer portion cause the coating system to have an elastic modulus that varies in a radial direction along radii extending outwardly from a center of the core of the cable. Different types of modifiers that can be used for this purpose include, but are not limited to, fillers, e.g. nanoclays; cross-linking agents, e.g. acrylates; polymerization chain transfer agents; photoinitiators, e.g. alpha-hydroxy ketones. The coating is provided with different modulus by adding different amounts of modifiers or different modifiers to the coating material.

In an example, the radially-varying elastic modulus varies gradually. The radial variation could be, for example, a stepwise function such that the radial variation would change abruptly at some location within the coating.

The optical fiber may comprise an additional coating that surrounds the outer portion of the coating (three layers). The optical fiber may further comprise a color layer, such as ink, for example, which surrounds coating layer.

SUMMARY OF THE INVENTION

The Applicant has observed that it is desirable to have an optical fiber with the following characteristics:
- coating layers with elastic modulus values radially increasing departing from the optical fiber longitudinal axis, so as to improve characteristics of microbending resistance;
- a colored coating layer, for readily allowing the fiber identification;
- good interfacial characteristics, especially adhesion, of the colored coating material with the second coating material, so as to avoid detachment between colored coating layer and second coating layer during fiber manipulation and/or under thermal or chemical critic conditions or in connection with the stripping of layers superposed thereto (e.g. buffer layer, ribbon matrix layer), because the two layers constitute a substantially monolithic entity.

The Applicant has observed that the manufacturing of a colored optical fiber with coating layers with elastic modulus values radially increasing departing from the optical fiber longitudinal axis can be cumbersome.

In particular, in connection with the above discussed US 20040170367, the Applicant has observed that the disclosed process provides for the contemporaneous curing of coating layers applied to the fiber. Such a process is wholly wet-on-wet, as will be explained hereinbelow, and makes it difficult to control the diameters of the layers, especially when the layers are three.

The Applicant has observed that the curing radiation provided to a layer of coating material could have an effect on the material of the underlying layer so as to increase the curing degree thereof.

The Applicant has perceived that the colorant contained in a colored coating material could help to filter the curing radiation reaching an underlying, substantially uncured coating layer. The radiation shielding effect of the colored coating layer could be exploited to modulate the elastic modulus by means of different curing degrees. This is particularly advantageous when the material of the colored, upper layer is the same as the material of the second, underlying layer, differing in the presence of a colorant only.

In one aspect the present invention relates to a process for manufacturing an optical fiber, said process comprising the steps of:
- drawing an optical waveguide from a glass preform;
- applying a layer of a first coating material onto the optical waveguide;
- curing the first coating layer material to obtain a first coating layer;
- applying a layer of a second coating material onto the first coating layer;
- applying a layer of colored coating material onto the layer of second coating material;
- curing the second coating material and the colored coating material in a single step, to obtain a second coating layer superposed on the first coating layer and a colored coating layer superposed on the second coating layer, the obtained second coating layer having an elastic modulus higher than that of the first coating layer and lower than that of the colored coating layer.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purposes of the present invention, the following definitions apply.

"Optical waveguide": glass portion of the optical fiber comprising a core surrounded by a cladding;

"Curing": hardening of a polymer material, e.g. by cross-linking of polymer chains, brought about by a radiation source such as ultraviolet radiation, Electron Beam (EB) or heat.

"Elastic modulus" (also known as "Young's modulus", or, in symbols, "E"): describes tensile elasticity or the tendency of an object to deform along an axis when opposing forces are applied along that axis; it is defined as the ratio of tensile stress to tensile strain ($E=\sigma/\epsilon$).

"Wet-on-dry" process: multiple coating deposition wherein a first coating material, in liquid form, is applied to the optical waveguide; the coated optical waveguide is then passed through a curing stage whereby the first coating material is exposed to radiant energy to cure (and harden). A second coating material is then applied in liquid form over the cured first coating layer of the optical fiber. The coated optical fiber is once again passed through a curing stage where the second coating material is exposed to radiant energy in order to cure (and harden).

"Wet-on-wet" process: multiple coating deposition wherein a first material, in liquid form, is applied to the optical waveguide followed by application of a second coating material, also in liquid form, with no substantial intervening curing stage between the application of the first coating material and the application of the second coating material. A first coating and a second coating result from the simultaneous curing of the first coating material and the second coating material.

Optionally, the process of the invention comprises the step of heating the layer of second coating material before applying the layer of colored coating material. This allows achieving a better control on the fiber diameter. Said heating may be carried out by exposure to radiant energy, for example generated by an InfraRed (IR) source or an UV source; in the latter case, the possible curing level of the second layer before the application of the third colored layer should in any case be such to ensure that the additional curing caused by the radiation filtering through the colored material during the curing thereof reaches a curing degree of the second layer of from 90% to 96%.

A degree of curing should be obtained such as to achieve an elastic modulus of the second layer material with a value preferably equal to or lower than 1% of the elastic modulus value said material has following a 100% curing. The elastic modulus values of a material after 100% curing can be readily known by the skilled in the art, e.g. by a test or by the technical sheet of a marketed coating material.

The applicant observed that in a coating layer with a curing degree lower than 90% dimensional modifications, e.g. changes in the diameter, take place during the fiber life. Such a phenomenon could be due to the migration of unreacted species toward adjacent layers.

Preferably, the process of the present invention comprises curing the second coating layer to a degree of less than 96% during the curing of the colored coating material.

Preferably, the process of the present invention comprises curing the second coating layer to a degree higher than approximately 90% during the curing of the colored coating material.

Advantageously, the process of the invention comprises curing the second coating layer to a degree corresponding to an elastic modulus from 10% to 50% lower than the elastic modulus of the colored coating layer in the finished optical fiber.

In another aspect, the present invention relates to an optical fiber comprising:
    an optical waveguide;
    a layer of first coating material surrounding the optical waveguide;
    a layer of second coating material surrounding the layer of first coating material; and
    a layer of colored coating material surrounding the layer of second coating material,
    wherein:
        said first, second and colored coating materials have elastic modulus values increasing departing from the optical waveguide;
        said colored coating material has an elastic modulus of 500-1000 MPa;
        said second coating material has an elastic modulus from 10% to 50% lower than the elastic modulus of the colored coating material; and
        the layer of second coating material is cured at a percentage lower than 96%.

Preferably, the layer of second coating material is cured at a percentage equal to or higher than 90%.

Preferably, the layer of first coating material has an elastic modulus of from 1 to 2 MPa.

Preferably, said optical waveguide has a diameter of approximately 125 μm.

Preferably, the layer of first coating material has a thickness of from 30 to 35 μm.

Preferably, the layer of second coating material has a thickness of from 20 to 35 μm.

Advantageously, the layer of the colored coating material has a thickness suitable to provide mechanical resistance.

Furthermore, the colored coating material has a shielding effect which depends on the thickness of the layer. The thickness of the layer of colored coating material can be selected as a function of the colorant contained therein. In view of the spectrum absorbance, some colorants, for example black and white, provide the colored layer with a shielding capacity higher than other colorant, for example yellow. For example, a layer of black-colored coating material can have a thickness smaller than that of a layer of yellow-colored coating material while providing substantially the same shielding effect on the curing of the second coating material.

Preferably, the layer of colored coating material has a thickness of from 10 to 15 μm.

Preferably, the second coating material is substantially the same as the colored coating material, the latter differing in that it contains a colorant.

Advantageously, the second and the colored coating materials contain substantially the same kind of at least one modifier, such as fillers, cross-linking agents, polymerization chain transfer agents, photoinitiators, and combinations thereof. Advantageously, said at least one modifier is contained in the second and the colored coating materials in substantially the same amount.

Using the same coating material for the second and for the colored layers ensures good interfacial characteristics between the two layers with the advantages already discussed above. Using the same coating material for the second and for the colored layers eases the processing from an operative point of view.

Optical fibers according to the invention are advantageously used to provide an optical fiber ribbon.

In still another aspect, the present invention relates to an apparatus for producing an optical fiber starting from a glass preform, said apparatus comprising:
    a first applicator device for applying a layer of first coating material onto an optical waveguide obtained from said glass preform;
    a first curing device for curing the layer of first coating material;
    a second applicator device for applying onto the layer of first coating material cured by the curing device a layer of second coating material and a layer of colored coating material onto the layer of second coating material; and
    a second curing device operable to provide an amount of radiant energy to cure at least the layer of colored coating material.

The amount of radiant energy provided by the curing devices according to the invention is selected in view of parameters such as drawing speed, chemical composition of the second and colored coatings, absorbance of the colorant in the colored coating material, thickness of the colored coating layer, desired degree of curing of the layer/s.

Preferably, the apparatus further comprises a heating device for heating the layer of second coating material before the application of the layer of colored coating material.

The heating device may comprise a third curing device.

The apparatus may comprise a first diameter measuring device before said first applicator device, and/or a second diameter measuring device after the first applicator device and before the second applicator device, and/or a third diameter measuring device after the heating device and before said second curing device, and/or a fourth diameter measuring device after said second curing device.

The optical fiber manufactured according to the present invention is a three coating layered-optical fiber. This optical fiber exhibits good fiber performances in terms of break-out, handling and aging in water, and shows microbending performances at least equivalent to that of the prior-art. Without being bound to a particular theory, it is believed that said performances could be due to the fact that the layer of colored coating material acts as a shield against the curing radiation. Therefore, the layer of second coating material experiences less radiation power than in the case of a two layered coating. The layer of second coating material, even if formed of the same material of the colored coating material, has a lower modulus after curing.

BRIEF DESCRIPTION OF THE DRAWINGS

The features and advantages of the present invention will be best understood reading the following detailed description of an embodiment of the invention, provided merely by way of non-limitative example, making reference to the annexed drawings, wherein.

DETAILED DESCRIPTION OF AN EMBODIMENT OF THE INVENTION

Figure 1:
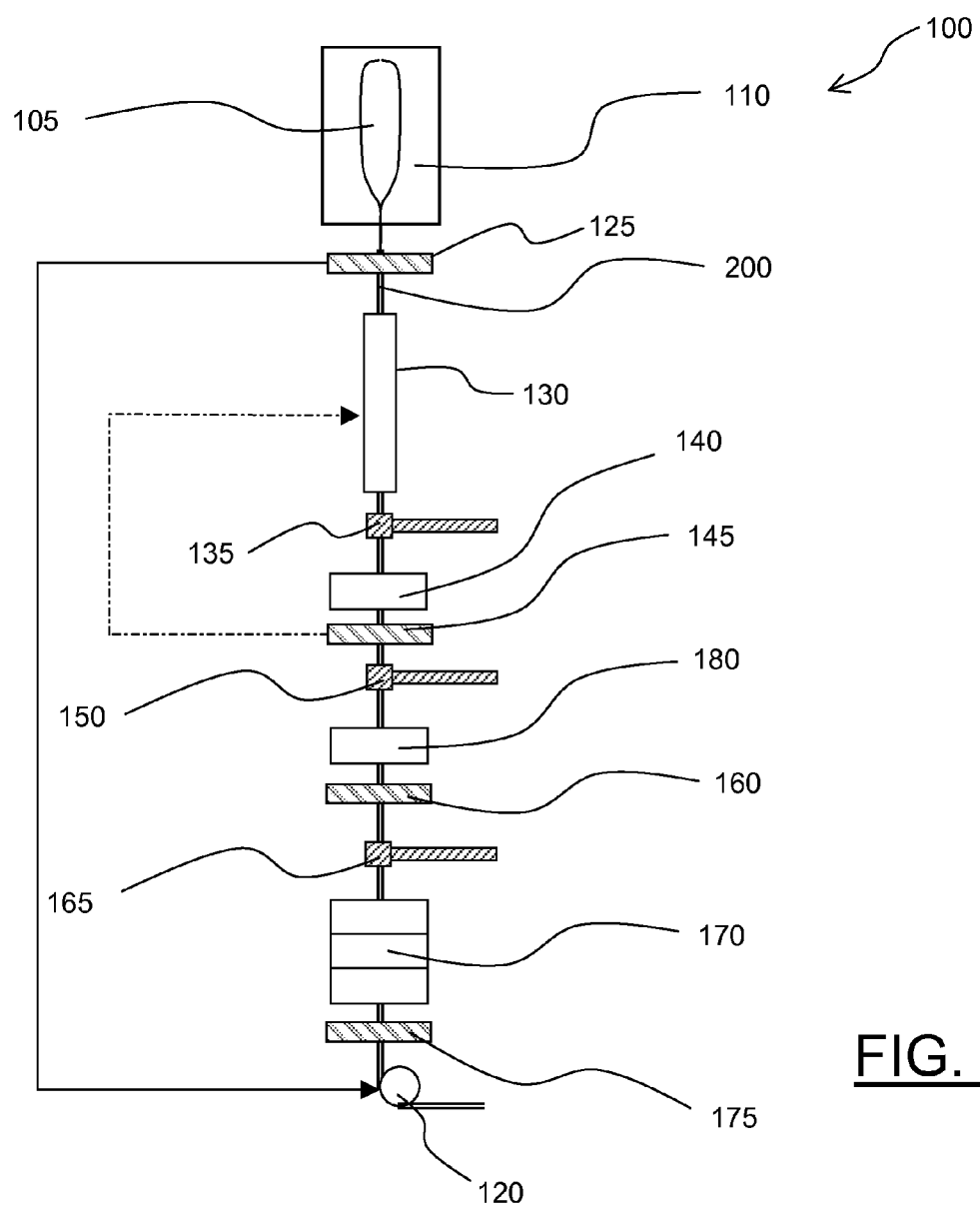
FIG. 1 schematically shows an apparatus according to an embodiment of the present invention for manufacturing an optical fiber by a method according to the present invention.

Making reference to the drawings, in FIG. 1 an apparatus 100 according to an embodiment of the present invention is schematically depicted, for the manufacturing of a three coating-layered optical fiber 200 by a method according to an embodiment of the present invention.

In particular, the apparatus 100 of FIG. 1 is a vertical draw apparatus, to be mounted in an optical fiber drawing tower, suitable for a wet-on-dry application of all the three layers of the three layered optical fiber. It is pointed out that different apparatus layouts, for example suitable for a wet-on-wet or mixed wet-on-wet/wet-on-dry application of the three layers are also possible. The drawing tower and resin applicators of the wet-on-wet or wet-on-dry type are known per se and will not be described in detail.

A glass preform 105 is drawn in a furnace 110 to obtain the optical waveguide of the fiber 200. The fiber 200 is taken down by a tractor 120. During the drawing, the diameter of the fiber 200 is measured at the exit of the furnace 110 by a first measuring device 125. In case of deviation from a target diameter value (e.g., 125 µm) the first measuring device 125 may send a signal to the tractor 120, which may vary its rotational speed appropriately.

The fiber 200 is then caused to pass through a cooling tube 130, where it is cooled down, to reach a temperature, for example, lower than 50° C., and then it is caused to pass through a first applicator device 135, having applicator dyes adapted to apply onto the glass fiber 200 a layer of a first coating material; in particular, the layer of first coating material may be applied in the form of a viscous resin.

Then, the fiber 200 coated with a layer of first coating material is caused to pass through a first curing device 140, e.g. a UV lamp or system of UV lamps, which is adapted to bring about the curing of the first coating material; the degree of curing depends on the UV power irradiated by the curing device 140, and/or on the fiber drawing speed. It is observed that since, in subsequent manufacturing stages (described hereinafter) the first coating material may receive additional doses of UV power, the curing of the first coating material by exposure to the UV power provided by the first curing device 140 does not necessarily need to be complete.

The first curing device 140 can comprise from 1 to 4 UV lamps providing an amount of radiant energy ranging from 45 W/cm² to 150 W/cm² per lamp.

Downstream the first UV curing device 140, the diameter of the fiber coated with a layer of first coating material may then be measured by a second measuring device 145. The measured diameter value can be used to ascertain that the diameter of the optical fiber 200 is correct; in case the measured diameter value departs too much from a target diameter value, the optical fiber may be discarded; alternatively, the measured diameter value can be used as a feedback to the cooling tube 130, in order to vary the temperature to which the fiber 200 enters in the dyes of the first applicator device 135. The amount of viscous resin which the fiber 200 can drag, that is, the thickness of the first coating layer, depends on the dye geometry and on the temperature of the incoming fiber 200 with respect to that of the viscous resin. It was observed that measuring the diameters of the various layers of the optical fiber 200 at the end of the manufacturing process may be difficult, so that taking measures of the diameters of one or more of the layers making up the optical fiber 200 during the manufacturing may be advantageous.

Then, the fiber 200 passes through a second applicator device 150, having applicator dyes arranged to apply onto the fiber (covered by the first coating layer) a layer of a second coating material; in particular, the second coating material is applied in the form of a viscous resin.

The diameter of the fiber covered with the layers of first and second coating materials may then be measured by a third measuring device 160. Similarly to the second measuring device, the diameter value measured by the third measuring device 160 can be used to ascertain that the diameter of the optical fiber 200 is correct; in case the measured diameter value departs too much from a target diameter value, the optical fiber may be discarded; alternatively, the measured diameter value can be used as a feedback to the cooling tube 130, in order to vary the temperature to which the fiber enters in the dyes of the first applicator device 135.

Finally, the fiber 200 is caused to pass in a third applicator device 165, which has applicator dyes adapted to apply onto the fiber covered by the first and second coating materials a third layer of a colored coating material. The colored coating material may be in the form of a viscous resin, and includes a colorant of a type and in an amount suitable to obtain a fiber having a desired external color.

The colored coating material may be of a same material as the second coating material, differing from it for the presence of the colorant; more generally, the colored coating material may be of a material chemically compatible to the second coating material.

The colorant may be an inorganic pigment, or, more generally, a pigment that is chemically inert in respect to the other chemical components of the colored coating layer.

Then, the fiber 200 is caused to pass through a second curing device 170, e.g. a UV lamp or system of lamps, which is adapted to cause the curing of the viscous resin forming the colored coating material, the degree of curing depending on the UV power irradiated by the second curing device 170, and/or on the fiber drawing speed.

The second curing device 170 can comprise from 1 to 6 UV lamps providing an amount of radiant energy ranging from 45 W/cm² to 150 W/cm² per lamp.

Due to the colorant present in the colored coating material, the colored coating material acts as a shield to the UV radiation. Therefore, the contribution of the second curing device 170 to the curing of the resin forming the second coating material depends on the characteristics of the colored coating material, on its UV radiation shielding capability; in any case, the degree of curing of the resin forming the second coating material caused by the UV radiation generated by the second curing device 170 is reduced compared to what would be obtained should the colored coating material be absent.

The diameter of the fiber covered with the three layers is then measured by a fourth measuring device 175. Similarly to the second and third measuring devices (145, 160), the fiber diameter value measured by the fourth measuring device 175 can be used to ascertain that the diameter of the optical fiber 200 is correct; in case the measured diameter value departs too much from a target diameter value, the optical fiber may be discarded; alternatively, the measured diameter value can be used as a feedback to the cooling tube 130, in order to vary the temperature to which the fiber enters in the dyes of the first applicator device 135.

In an embodiment of the present invention, after exiting the second applicator device 150, the fiber is caused to pass through a device 180, for example a third curing device, e.g. UV lamp or system of lamps, adapted to cause the viscous resin forming the second coating material to be cured to a certain degree, depending on the UV power irradiated by the device 180, and/or on the fiber drawing speed; in this case, the contribution of the second UV lamp or system of lamps 170 to the curing of the resin forming the second coating material may be reduced or even negligible. The exposure of the viscous resin forming the second coating material to UV radiation before applying the layer of colored coating material advantageously causes the heating of the second coating material, which allows to achieve a better control the final diameter of the optical fiber. The UV power irradiated by the device 180 may also cause an increase of the curing level of the resin forming the first coating material. In some embodiments of the invention, the device 180 may include, in addition or in alternative to the third curing device, a heating device like an IR source adapted to heat the second coating material.

The device 180 can comprise from 1 to 2 UV lamps providing an amount of radiant energy ranging from 5 W/cm$^2$ to 40 W/cm$^2$ per lamp.

Figure 2:
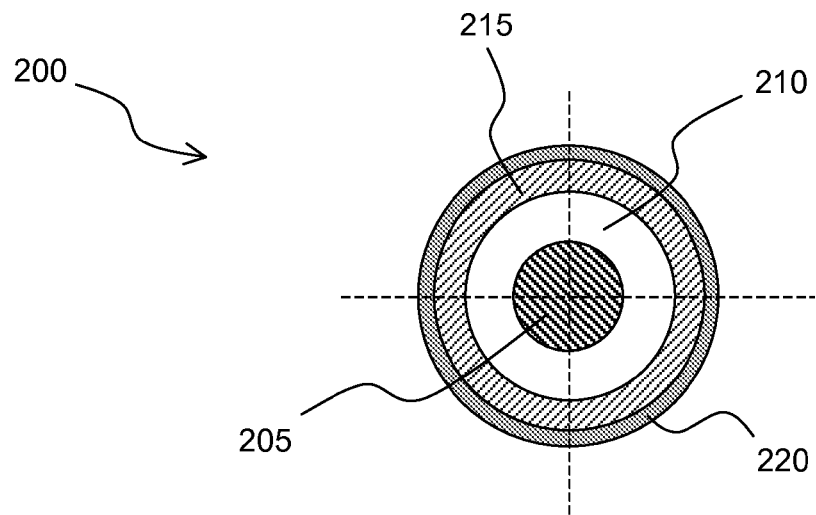
FIG. 2 shows schematically a cross section of an optical fiber, in a plane transversal to the optical fiber axis, obtained by a method according to the present invention.

FIG. 2 shows schematically a cross section of the optical fiber 200 manufactured following a method according to an embodiment of the present invention; the cross section is taken in a plane transversal to the optical fiber axis. In the drawing, the glass optical waveguide (comprising core and cladding) of the fiber 200 is indicated with 205, the layer of first coating material is indicated with 210, the layer of second coating material is indicated with 215, and the layer of colored coating material is indicated with 220.

The optical waveguide 205 may for example have a standard diameter of about 125 μm (a standard value in optical fibers for telecommunications applications).

The layer 210 of first coating material has a relatively low elastic modulus, for example of the order of 1-2 MPa in the temperature range of use of the optical fiber, e.g. from −30° C. to 60° C. The thickness of the layer 210 of first coating material may be of from 30 to 35 μm.

The layer 215 of second coating material may have an intermediate elastic modulus, higher than the elastic modulus of the layer 210 of first coating material and lower than that of the layer 220 of colored coating material. Preferably, the layer 215 has a thickness of from 20 to 30 μm. Preferably, the material of the layer 215 has a curing degree of less than 96%. Advantageously, the curing degree of the material of the second layer 215 is higher than 90%, to avoid possible migration of unreacted species, which may result in changes in the coating layers thickness.

The layer 220 of colored coating material may have a relatively high elastic modulus, higher than that of the layer 215 of second coating material, for example of from 500 to 1000 MPa. Preferably the thickness of layer 220 is of about 10-15 μm. Preferably, the elastic modulus of the second layer 215 of second coating material is about 10-50% lower than that of the colored coating material. The material, e.g. the resin used for the colored coating layer may have basically the same chemical composition as that of the second coating material, and contains colorant.

The external diameter of the fiber 200 may be in the range from 245 to 255 μm.

The resins used for the any or each of the first, second and colored coating materials can be those described in U.S. Pat. No. 6,797,740. The amount of colorant to be used may be chosen based on the thickness of the coating layers, as known to those skilled in the art.

The fiber produced according to the invention shows equal or even improved microbending resistance with respect to known fibers, thanks to the radially increasing elastic modulus. The layer of second coating material is not the main element providing mechanical resistance of the fiber, thus it can have lower elastic modulus than the colored coating layer.

Moreover the colored external layer allows the fiber identification in multi-fiber cables, without the need of a further process step of coloring the fiber in the cable plant.

Experimental Results

In a drawing apparatus like the apparatus 100 described in the foregoing, a glass preform having a step index profile for the refractive index has been drawn at 20 m/s. The preform has been chosen to have large ratio between Mode Field Diameter (MFD) and cut-off wavelength (said ratio being hereinafter also referred to as "MAC") in order to emphasize the microbending sensitivity. The resulting optical fiber turned out to have an average MFD=9.31 μm (at a wavelength of 1310 nm), cabled cut-off wavelength=1138 nm and average MAC=8.18.

Two optical waveguides having a diameter of 125 μm were coated with a first coating material (DeSolite® 6D1-78 marketed by DSM Desotech) a second coating material (DeSolite® 3471-2-136 marketed by DSM Desotech) and a third colored material (DeSolite® 952-014, that is DeSolite® 3471-2-136 plus a green colorant, marketed by DSM Desotech) said materials being applied to provide the thickness values reported in Table I.

TABLE I

| Sample | UV power 1$^{st}$ layer | UV power 2$^{nd}$ layer | UV power 3$^{rd}$ colored layer | 1$^{st}$ layer thickness (μm) | 2$^{nd}$ layer thickness (μm) | 3$^{rd}$ layer thickness (μm) |
|---|---|---|---|---|---|---|
| 1* | 1 × 100% | 1 × 100% | 3 × 100% | 31.5 | 22.5 | 10 |
| 2 | 1 × 100% | 1 × 25% | 4 × 100% | 31.5 | 22.5 | 12.5 |

In Table I, the UV power is expressed as number of lamps× percentage of radiation power of each lamp (100%=93 W/cm$^2$). The first and second coating layers of the comparative sample 1 received an amount of radiation such to cure the materials thereof before the application of the third colored layers (wet-on-dry process). The second layer of sample 2 according to the invention received an amount of radiation of about 23 w/cm$^2$ such to impart a curing degree lower than 90% thus leaving the material uncured.

The microbending sensitivity of comparative Sample 1 and of Sample 2 according to the invention has been tested according to IEC 62-221 IR3 Ed. 1 with an expandable bobbin at room temperature. The results are reported in Table II herebelow.

TABLE II

| Sample | Microbending sensitivity @1550 nm [dB/km/(g/mm)] |
|---|---|
| 1 | 4.67 |
| 2 | 3.77 |

Sample 2 according to the invention has a significantly lower microbending sensitivity with respect to a standard double layered fiber (comparative sample 1). The dependence of the microbending sensitivity from the coating modulus (depending, in turn, from the curing degree of the coating material) is discussed, for instance, in F. Cocchini et al., Journal of Lightwave Techn. 13 (1995), page 1706. The attenuation increase of an optical fiber slightly pressed onto an external rough surface is proportional to the ratio $D/H^2$ as shown in the following equation:

$$\Delta\alpha \propto \frac{D}{H^2} \qquad \text{eq. 1}$$

wherein D is the lateral rigidity of the coating system (MPa) and H is the flexural rigidity (MPa·mm$^4$). In the case of a double coating layer, the flexural rigidity H is defined as:

$$H = H_0 + H_2 = \pi R_0^4 E_0 + \pi (R_2^4 - R_1^2) E_2 \qquad \text{eq. 2}$$

where the terms Ei are the modulus and the terms Ri are the radius of each component, with i=0 for the glass core, i=1 for the inner coating layer and i=2 for the outer coating layer, respectively.

The lateral rigidity dependence on the dual coating system can be expressed as:

$$D_{coating} \approx E_1 + E_2 \left(\frac{R_2 - R_1}{R_2}\right)^3 \qquad \text{eq. 3}$$

The added losses caused by the microbending do not substantially change as a function of the modulus of the second coating layer material.

Figure 3:
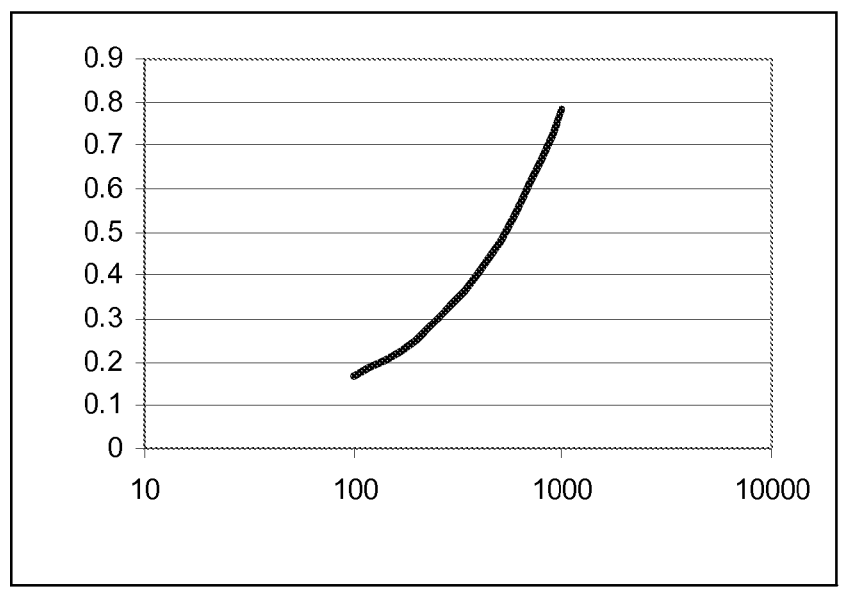
FIG. 3 is a diagram showing a dependence of fiber losses (attenuation, in ordinate) on the elastic modulus (in abscissa) of the layer of second coating material of an optical fiber according to an embodiment of the present invention.

In the case of the coating system of the present invention, a third term $\pi(R_3^4 - R_2^2)E_3$ has to be added to eq. 2, because the thickness of the third colored layer acquires relevance. As for eq. 3 a term $$E_3 \left(\frac{R_3 - R_2}{R_3}\right)^3$$

should be added. In this hypothesis, the added losses caused by the microbending substantially decrease as a function of the modulus of the second coating layer material in the region below 700 Mpa. This is reported in FIG. 3 (the following values for the various terms are assumed: $2R_0=125$ μm, $2R_1=190$ μm, $2R_2=245$ μm, $2R_3=250$ μm, $E_0=72000$ Mpa, $E_1=1$ MPa, $E_3=1000$ MPa). The attenuation in ordinate is expressed as 1/MPa·mm$^8$ because, according to equation 1, it is proportional to the ratio $D/H^2$, and the proportionality constant depends from the optical characteristics of the waveguide and from the intensity of the lateral stress. The elastic modulus of the second coating is expressed as log MPa.

The present invention was herein disclosed making reference to some exemplary and non-limitative embodiments thereof. Those skilled in the art will readily recognize that several modifications to the described embodiments, as well as alternative embodiments of the invention are possible, without departing from the scope of the invention as defined in the appended claims.

The invention claimed is:

1. A process for manufacturing an optical fiber comprising:
   drawing an optical waveguide from a glass preform;
   applying a layer of a first coating material onto the optical waveguide;
   curing the first coating layer material to obtain a first coating layer;
   applying a layer of a second coating material onto the first coating layer;
   applying a layer of colored coating material onto the layer of second coating material; and
   curing the second coating material and the colored coating material in a single step, wherein the second coating material is cured to a percentage equal to or higher than 90% and lower than 96% to obtain a second coating layer superposed on the first coating layer and a colored coating layer superposed on the second coating layer, the obtained second coating layer having an elastic modulus higher than that of the first coating layer and lower than that of the colored coating layer.

2. The process of claim 1, further comprising:
   heating the layer of a second coating material before applying the layer of colored coating material.

3. The process of claim 2, further comprising:
   heating said second coating material by UV radiation.

4. An optical fiber comprising:
   an optical waveguide;
   a layer of first coating material surrounding the optical waveguide;
   a layer of second coating material surrounding the layer of first coating material; and
   a layer of colored coating material surrounding the layer of second coating material,
   wherein:
   said first, second and colored coating materials have progressively increasing elastic modulus values from the optical waveguide;
   said colored coating material has an elastic modulus of 500-1000 MPa;
   said second coating material has an elastic modulus of 10% to 50% lower than the elastic modulus of the colored coating material; and
   the layer of second coating material is cured at a percentage lower than 96%.

5. The optical fiber of claim 4, wherein the layer of second coating material is cured at a percentage equal to or higher than 90%.

6. The optical fiber of claim 4, wherein the layer of first coating material has an elastic modulus of 1 to 2 MPa.

7. The optical fiber of claim 4, wherein the layer of first coating material has a thickness of 30 to 35 μm.

8. The optical fiber of claim 4, wherein the layer of second coating material has a thickness of 20 to 35 μm.

9. The optical fiber of claim 4, wherein the layer of colored coating material has a thickness of 10 to 15 μm.

10. A optical fiber ribbon comprising optical fibers according to claim 4.

* * * * *